United States Patent Office 3,472,937
Patented Oct. 14, 1969

3,472,937
PESTICIDAL METHODS EMPLOYING PERHALO-
INDONE-CARBOXYLIC ACID ESTERS
Edward D. Weil, Yonkers, N.Y., assignor to Hooker
Chemical Corporation, Niagara Falls, N.Y., a corporation of New York
No Drawing. Continuation-in-part of application Ser. No. 241,118, Nov. 30, 1962, now Patent No. 3,361,788. This application Dec. 1, 1966, Ser. No. 598,169
Int. Cl. A01n 9/20, 9/24; C07c 69/00
U.S. Cl. 424—308     6 Claims

ABSTRACT OF THE DISCLOSURE

There are provided novel pesticidal uses of compounds of the formulae

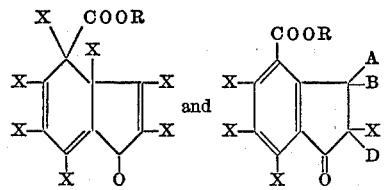

wherein R represents a monovalent organic radical selected from the group consisting of unsubstituted alkyl of 1 to 20 carbon atoms, and substituted alkyl of 1 to 20 carbon atoms, wherein the substituents are selected from the group consisting of lower alkenyl, lower alkoxy, and phenyl; A represents chlorine, bromine, or substituted amino substituent, such substituted amino substituent being selected from the group consisting of alkyl of 1 to 20 carbon atoms, and phenyl; X represents chlorine or bromine; and B and D represent chlorine or termini of a chemical bond connecting the carbon atoms to which B and D are joined. These compounds are especially useful as nematocides and bactericides.

---

This application is a continuation-in-part of my copending application Ser. No. 241,118, filed Nov. 30, 1962, now Patent No. 3,361,788.

The present invention relates to the pesticidal use of esters having the indene skeleton.

The pesticidal esters of the invention may be described by the formulae:

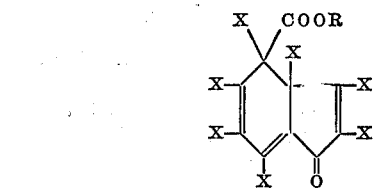

and

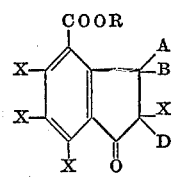

wherein:
(a) R is selected from the group consisting of unsubstituted alkyl of 1 to 20 carbon atoms; substituted alkyl of 1 to 20 carbon atoms wherein the substituent is selected from the group consisting of lower alkenyl, lower alkoxy, and phenyl; phenyl; naphthyl; lower hydroxyalkyl of from 1 to 6 carbon atoms; and a radical of the formula —ZOZ′ wherein Z is lower alkylene of 1 to 6 carbon atoms and Z′ is lower alkyl of from 1 to 6 carbon atoms.

(b) A is selected from the group consisting of halogen; amino, substituted amino, wherein the substituent on the amino is selected from the group consisting of
(1) Unsubstituted alkyl of 1 to 20 carbon atoms,
(2) Substituted alkyl of 1 to 20 carbon atoms, wherein the substituent is selected from the group consisting of lower alkenyl, lower alkoxy and phenyl,
(3) Phenyl,
(4) Naphthyl, and
(5) A divalent organic radical selected from the group consisting of alkylene and arylene of 1 to 20 carbon atoms;

(c) X is halogen; and
(d) B and D are selected from the group consisting of chlorine, bromine, and the termini of a chemical bond connecting the carbon atoms to which B and D are joined.

As is seen from the description of A, above, an equivalent halogen, such as bromine, may be employed in place of chlorine to obtain a similarly useful product. Thus, Cl may be replaced in the formula by X for suitable halogen.

The invention encompasses the pesticidal use of esters of the types:

(A) 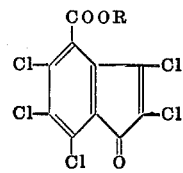

(B) 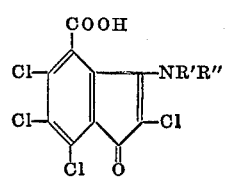

(C) 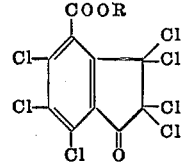

(D) 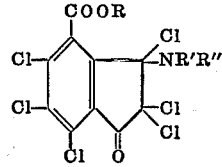

(E) 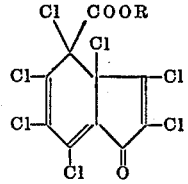

where R′ and R″ are defined as hydrogen, alkyl, aryl, acyl, or lower hydroxyalkyl substituents. Suitable halogens, preferably bromine, may replace chlorine in the structures shown. Alkyl substituents having from one to twenty carbon atoms are preferred in the present invention. The preferred alkyl groups may be unsubstituted or substituted by lower alkenyl, lower alkoxy, and in the case of R′ and R″, by amino, or by an amino group which is itself substituted by an indene skeleton of the type contemplated herein. In the latter case, a compound results in having two indene skeletons, joined through the amino group of each by an alkylene group. Other divalent linking groups may be substituted for alkylene such as aromatic, for example, phenylene. In addition to the preferred alkyl substituents being of one to twenty carbon atoms, it is generally preferred that R, R' and R'' be of such carbon content, if R' and R'' contain any carbon and that R' and R'' be of zero to six carbon atoms, whether R, R' and/or R'' are alkyl, aryl, acyl or other permissible group.

Aryl substituents preferred for use in the present invention include phenyl, benzyl, naphthyl, and lower alkylated and chlorinated derivatives thereof.

The acyl substituents preferred are those derived from aliphatic and aromatic carboxylic acids including benzoic acid chlorinated and lower alkylated derivatives thereof.

R' and R'' may be conjoined to form divalent linking radicals and thus to form cyclic amino substituents. The divalent organic radicals may contain oxygen, sulphur, or phosphorus atoms as well as well as carbon. Specific examples include morpholino, pyrrolidino, piperidino, piperazino, and aziridinyl radicals.

Specific examples of pesticidal compounds of the types described above include the following:

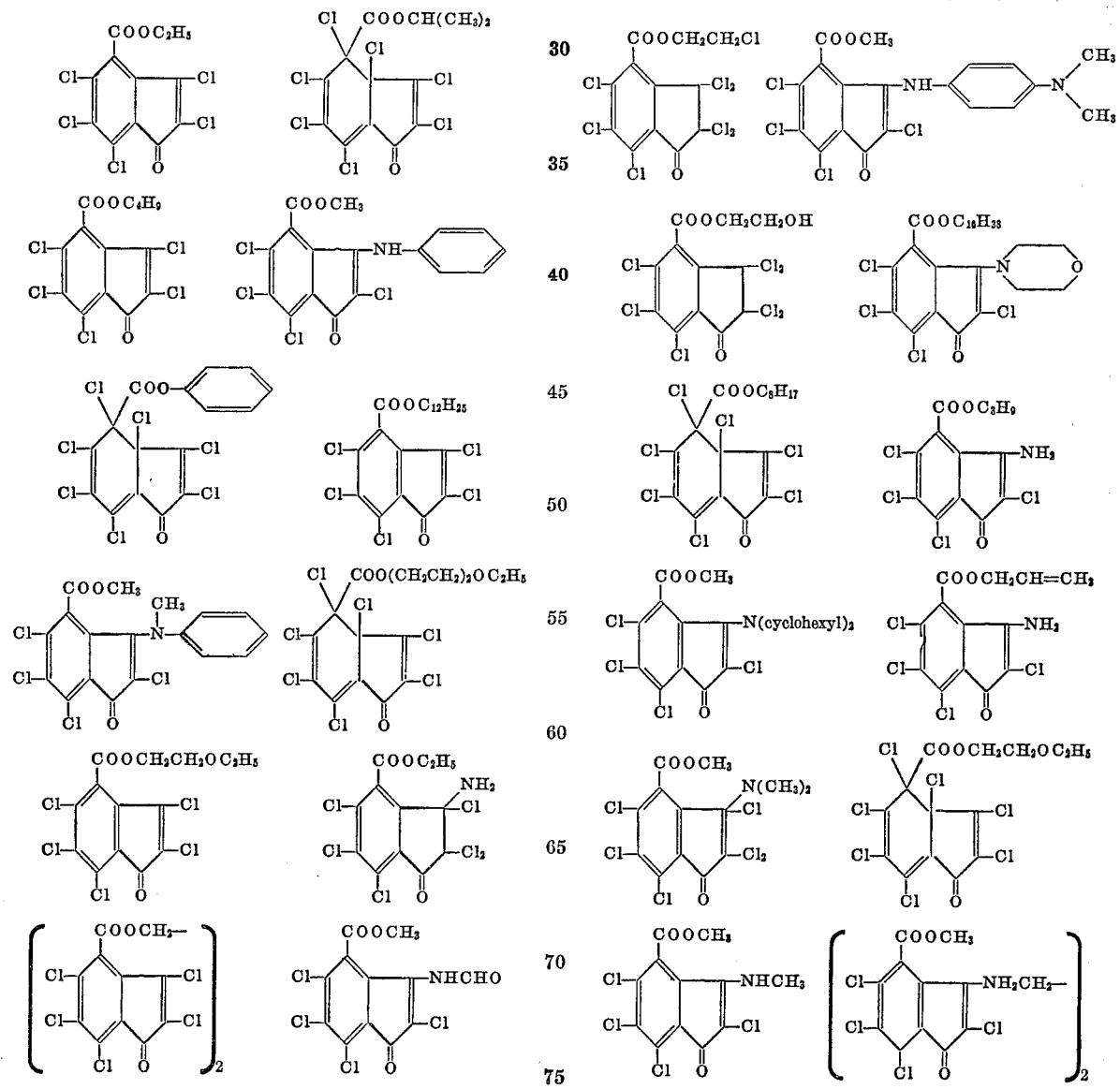

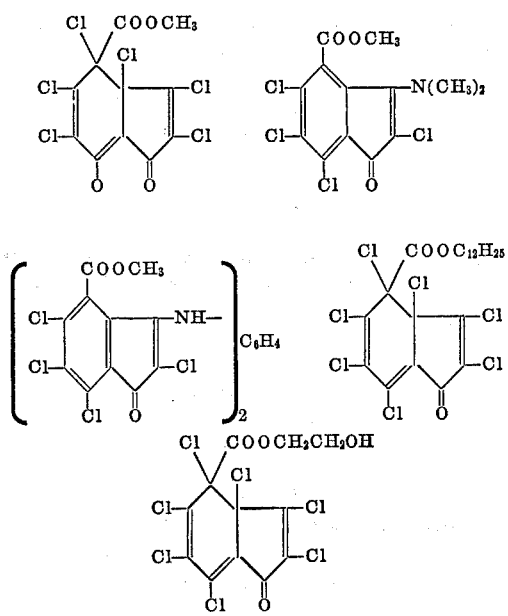

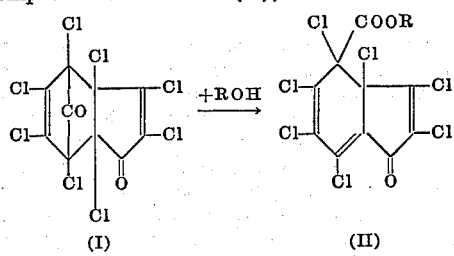

Some of the pesticidal compounds of the present invention may be prepared from the reaction products of octachloro-3a,4,7,7a-tetrahydro - 4,7 - methanoindene - 1,8-dione (I) with an alcohol (ROH), the reaction forming compounds of structure (II), as follows:

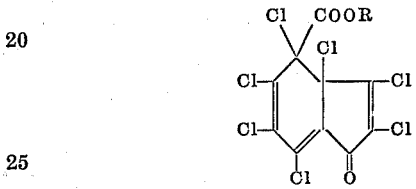

The compounds wherein A is chlorine and B and D represent the termini of a bond connecting the carbon atoms to which B and D are attached are formed as follows. Compounds of structure (II) are treated with a halogen- or chlorine-abstracting agent, which may be (a) an inorganic iodide such as NaI or KI, (b) an element capable of combining the chlorine such as zinc, iron, aluminum, nickel, copper, or sulfur, (c) a lower valence salt of a metal having a stable higher valence, such as $SnCl_2$, $FeCl_2$, $TiCl_3$, CuCl, (d) hydrogen in the presence of a hydrogenation catalyst such as platinum, palladium, or nickel, or (e) a substance which breaks down under the reaction conditions to yield hydrogen, such as hydrazine or dihydronaphthalene. A particularly convenient method, preferred beacuse of rapidity and completeness, is treatment of compounds of structure (II) with sodium iodide in acetone at ambient or near-ambient temperatures.

The compounds where A is an amino or substituted amino (R'R"N where R' and R" are chosen from the group comprising hydrogen, aryl, alkyl, or acyl substituents) and where B and D are the termini of a bond are prepared by reaction of the corresponding compounds where A is chlorine (and B and D are the termini of a bond) with ammonia or the appropriate amine (R'R"NH, where R' and R" are aryl or alkyl substituents). Where R' or R" is acyl, the corresponding compound with R' or R" equal to hydrogen is first prepared and this intermediate is contacted with an acylating agent R'COCl, R'CO—O—COR', R"CO—O—COR", R'COOH, or R"COOH (the last two under dehydrating conditions). The reaction of the perchloroesters where A is chloro (and B and D the termini of a bond) with ammonia or an amine is readily conducted by contacting the reactants at about —20 degrees to +150 degrees centigrade, conveniently 0–120 degrees centigrade, preferably in an inert solvent such as benzene, toluene, alcohol, acetone, dioxane, ethyl acetate, or the like. The released HCl may be captured by an extra mole of the ammonia or amine, or by another base such as sodium acetate, pyridine, triethylamine, soda ash, or the like.

The compounds where A is amino or chlorine, and where B and D are chlorine are prepared by chlorination of the corresponding compounds where B and D are the termini of a bond, by introducing chlorine or a chlorinating agent such as sulfuryl chloride or phosphorus pentachloride into the olefinic compound, conveniently dissolved in a chlorine-resistant solvent such as glacial acetic acid, carbon tetrachloride, trichlorobenzene, and the like.

It has further been found, surprisingly, that the compounds wherein A, B and D are chlorine may be prepared directly in good yield by the heating of compounds of the structure:

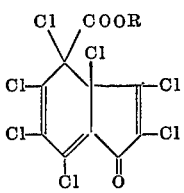

in the presence of a chlorinating agent, preferably chlorine and preferably in a chlorine-resistant solvent such as acetic acid, chlorinated hydrocarbons, or the like. Temperatures of from about 50 degrees centigrade to about 150 degrees centigrade are suitable for this process. In the place of chlorine itself, a chlorinating agent such as sulfuryl chloride, phosphorus pentachloride, or the like may be used. It is to be noted that the reaction does not result in a more highly chlorinated product as would have been predicted, but actually amounts to a rearrangement or shift of two chlorine atoms. In other words, the chlorinating agent appears to be acting as a catalyst instead of a chlorinating agent as such.

A further process for the production of compounds of the structure

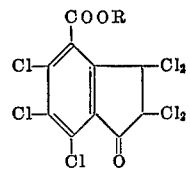

consists of heating compounds of the structure

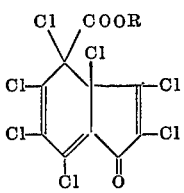

(the reaction products of octachloro-3a,4,7,7a-tetrahydro-4,7-methanoindene-1,8-dione with alcohols) at temperatures of 80 to 150 degrees centigrade for several hours to several days or at 150 to 250 degrees centigrade for 0.1 minute to several hours. Below the melting point of the starting material, it is preferred to use a solvent which should be chlorine-resistant, for example glacial acetic acid, chlorobenzene, or the like. In the 150 to 250 degrees centigrade range, at the lower end, reaction times of one to several hours are preferred; at the high end of this range reaction times of 0.1 minute to several minutes are preferred. At reaction times or temperatures in excess of these ranges, the product of the reaction is primarily perchloroindone. Below this range of temperatures, the rate of reaction is essentially nil. At any given temperature within the indicated range, it is advantageous to analyze the product from time to time by infrared absorption devices or other means, and to terminate the reaction when perchloroindone begins to appear in undesirably large amounts.

The reaction described above is a rearrangement with no net gain or loss of chlorine.

In the above reactions other suitable halogens and halogenating agents, such as bromine, may find use too. The compounds of this invention have been found to have a high order of pesticidal activity, particularly fungicidal activity. This is particularly surprising in that somewhat related structures, such as esters of trihalobenzoic acid and perhaloindone (e.g., trichlorobenzoic acid and perchloroindone), are not appreciably active in this respect.

Also surprising in view of the drab yellowish-orange color of perchloroindone is the brilliant canary yellow color of the esters of the invention wherein B and D are the termini of a bond, A is chlorine, and the halogens are also chlorine. This effect of the ester grouping could not have been predicted, since the ester grouping is not generally a chromophoric group. These esters have utility as yellow pigments.

Suitable alcohols from which the R group of the products may be derived are in general any alcohol, but preferably aliphatic alcohols such as methanol, ethanol, butanol, isopropanol, allyl alcohol, lauryl alcohol, Cellosolve alcohols, cyclohexanol, benzyl alcohol, 2-chloroethanol, ethylene glycol, sorbitol, pentaerythritol, propargyl alcohol, etc. Even large or complex compounds, provided that they possess alcoholic groups may be used, for example sucrose, polyvinyl alcohol, or cellulose. Thus the concept of the invention extends to attaching the chromophoric perchlorindone structure to cellulose by following the reaction of the invention wherein R is the cellulose monomer unit less one alcoholic —OH group.

A use for the compounds of the invention is as chemical intermediates. They can, for example, be converted to the free acids, the acid chlorides, or the amides, or to derivatives in which chlorine atoms on the aromatic ring are replaced by groups such as hydroxy or alkoxy by reaction with OH or alkoxides.

A particularly surprising and valuable conversion is the reaction of the compounds of the invention, wherein A, B, and D are halogen, e.g., chlorine, with bases such as sodium (or other metal) hydroxide or sodium (or other metal) alkoxide, as follows:

Compounds of types (IV) and (V) may be represented by the formula

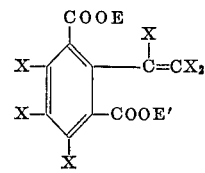

wherein X is halogen and E and E' are hydrogen or alkyl, preferably lower alkyl of one to ten or one to four carbon atoms.

Similarly,

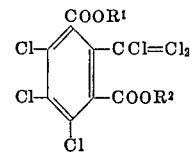

may be made by reacting

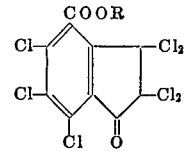

wherein R is a monovalent organic radical, with a reactant selected from the group consisting of (1) a base of formula $MOR^2$ and (2) a non-basic compound of formula $R^2OH$, plus a base, wherein M is a metal cation and $R^1$ and $R^2$ are selected from the group consisting of hydrogen, M and R. M is preferably alkali metal, e.g., sodium, potassium, and R is preferably lower alkyl.

The inability of the resultant acid-ester to form a cyclic anhydride upon strong heating constitutes the proof of structure of the compounds of the invention in regard to the orientation of the ketone carbonyl group relative to the carbalkoxy, since if the carbalkoxy group were located in the 7-position (ketone carbonyl being at the 1 position), the resultant compound from the above ring openings would be derivatives of an ortho-phthalic acid and would be extremely susceptible to cyclic anhydride

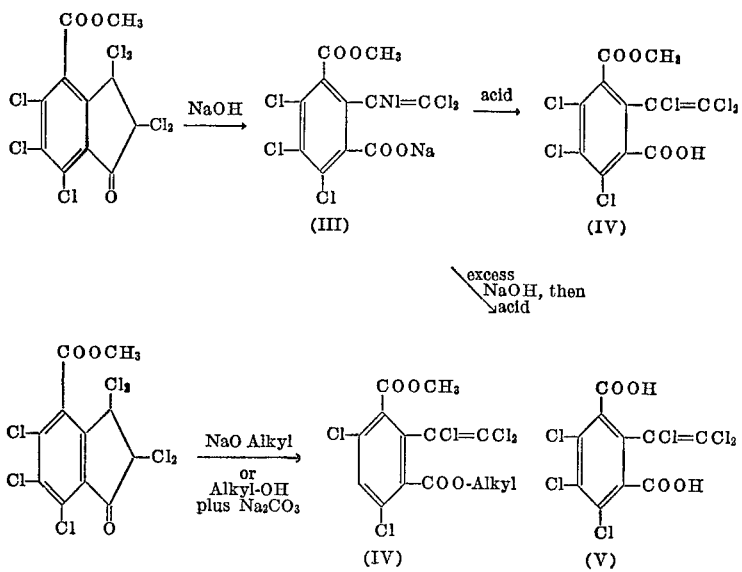

formation, which is contrary to the experimental evidence.

The 2-(trichlorovinyl)trichloroisophthalic acid and its derivatives, made as described above are useful as herbicides and fire retardants and as monomers for non-inflammable polyester resins. For example, heating the acid with ethylene glycol under esterification conditions (elimination of water) or heating the diester with ethylene glycol (elimination of alcohol) yields such resins.

In order to illustrate the invention, the following examples are given by way of illustration, without intent to limit same.

EXAMPLE 1.—REACTION OF OCTACHLORO-3a,4,7,7a - TETRAHYDRO - 4,7-METHANOINDENE-1,8-DIONE WITH METHANOL TO PREPARE COMPOUND II (R EQUALS METHYL)

25.4 grams of octachloro - 3a,4,7,7a - tetrahydro - 4,7-methanoindene-1,8- was refluxed with 100 ml. of methanol. After one half hour, the reaction mixture was chilled and the resultant crystalline precipitate removed by filtration to obtain 13 grams of pale yellow crystals, M.P. 124 to 130 degrees centigrade (A). This product after recrystallization from benzene-methanol mixture melted at 136 degrees centigrade.

*Analysis.*—Calculated for $C_{11}H_3O_3Cl_7$: C, 30.63; H, 0.70, Cl, 57.54. Found: C, 30.7; H, 0.84, Cl, 57.6.

The infrared spectrum (Nujol mull) showed bands at 5.67 (s.), 5.83 (s.), 6.15 (s.), 6.31 (m.), 6.52 (s.), 6.94 (m.), 8.0 (s.), 8.17 (s.), 8.28 (m.), 8.85 (w.), 9.16 (s.), 10.01 (m.), 10.11 (m.), 10.45 (s.), 10.73 (w.), 11.28 (w.), 11.47 (m.), 12.08 (m.), 12.52 (w.), 12.78 (m.), 12.92 (s.), 13.24 (m.), 13.96 (s.), 14.82 (m.) (microns).

The figures pertaining to infrared absorption refer to microns and the small letters used in conjunction with the figures have the following significance: w. corresponds to weak; m. to medium; s. to slight, and v. to very.

EXAMPLE 2.—PREPARATION OF 4-CARBOMETHOXYPENTACHLOROINDONE

To a solution of 30 grams of the methanol-octachlorotetrahydromethanoindenedione, product A of Example 1, dissolved in 500 ml. of acetone at 25 degrees centigrade, was added a solution of 100 grams of sodium iodide in 500 ml. of acetone. Iodine was evolved immediately. An aliquot was taken 15 seconds after admixture, rapidly added to excess water to quench the reaction by causing precipitation of the organic reactant, and the iodine quickly titrated with 0.1–N sodium thiosulfate. It was found that 99.6–100 percent of the theoretical one mole of iodine per mole of organic reactant had been evolved. A further aliquot held for one hour before quenching the titration showed 1.02 mole of iodine per mole of organic reactant. The bulk of the reaction mixture was worked up after 15 minutes, by addition of water, the precipitated solids being removed by filtration and washed with water until the washings were colorless. The crude product was a brilliant yellow crystalline solid having a melting point of 154.5 to 155 degrees centigrade and being obtained in a yeld of 23 grams (corrected for aliquots). The product is soluble in hot benzene, and moderately soluble in hot heptane. Recrystallization from the latter yield 21 grams yellow crystals, M.P. 157.8 degrees centigrade.

*Analysis.*—Calculated for $C_{11}H_3O_3Cl_5$: Cl, 49.3. Found: Cl, 49.1.

EXAMPLE 3.—PREPARATION OF 4-CARBOMETHOXHEPTACHLOROHYDRINDONE (B)

Chlorine gas was passed into a solution of 30 grams of the indone A of Example 1 in 300 ml. of glacial acetic acid at 95 to 100 degrees centigrade (steam bath) for 63 hours. The solution was then poured into 2 liters of water, the gummy precipitate extracted with methylene chloride, the extract washed, dried over calcium chloride, and evaporated. The residue was recrystallized from heptane (charcoal treatment) to obtain 19 grams of colorless prisms, M.P. 102 to 103 degrees centigrade; infrared carbonyl band (Nujol mull) at 5.71 (5.68 shoulder), C=C band at 6.36.

*Analysis.*—Calculated for $C_{11}H_3O_3Cl_7$: Cl, 57.54. Found: Cl, 57.4.

To 0.317 gram of B in 50 cc. acetone was added 25.00 cc. 0.1003–N NaOH. After one hour, the solution was back-titrated with 0.1–N HCl, indicating the consumption of 1 milliequivalent of NaOH per 214 mg. of B (theory, 215.7 mg./meq.). A similar experiment in which the alkaline solution was subjected to Volhard titration indicated the release of 1 milliequivalent of chloride per 428 mg. of B (theory, 431.5 meg./meq.).

EXAMPLE 4.—PREPARATION OF 2-(TRICHLOROVINYL) - 4,5,6-TRICHLOROISOPHTHALIC ACID MONOMETHYL ESTER

To a solution of 2.07 grams of the hydrindone B of the preceding example in 100 ml. of acetone was added 100 ml. of 0.1 N aqueous sodium hydroxide. After about 15 minutes the solution was titrated with 0.1 N aqueous hydrochloric acid to a phenolphthalein end point. The reaction mixture was then concentrated to a small volume to remove the acetone, filtered with a small amount of charcoal, and the clear filtrate acidified strongly with hydrochloric acid. The precipitate was removed by filtration and recrystallized from benzene-heptane mixture to obtain 0.7 gram of colorless crystals, M.P. 149 to 150 degrees centigrade.

*Analysis.*—Calculated for $C_{11}H_4O_4Cl_6$: Cl, 51.53; neutralization equiv., 412.5. Cl, 51.2; neutralization equiv., 410.5.

The infrared spectrum (Nujol mull) exhibited bands at 3.41 (s.), 5.71 (m.), 5.79 (s.), 6.04 (w.), 6.08 (w.), 6.25 (w.), 6.46 (m.), 7.73 (s.), 8.07 (v.s.), 8.37 (w.), 8.69 (m.), 9.71 (w.), 10.20 (w.), 10.66 (m.), 10.96 (m.), 11.15 (w.), 11.64 (m.), 12.26 (m.), 14.02 (w.).

EXAMPLE 5.—PREPARATION OF 3-AMINO-4-CARBOMETHOXY-2,5,6,7-TETRACHLOROINDONE-1

5 grams of 4-carbomethoxypentachlorindone dissolved in 200 ml. of benzene was treated with gaseous ammonia for 1¼ hour. The precipitate was filtered out and washed with water, benzene and warm acetic acid, leaving undissolved 4.3 grams of red needles, M.P. 241 degrees centigrade (decomp.).

*Analysis.*—Calculated for $C_{11}H_5O_3NCl_4$: Cl. 41.6; N, 4.11. Found: Cl, 41.6; N, 3.88.

EXAMPLE 6.—PREPARATION OF 3-ANILINO-4-CARBOMETHOXY - 2,5,6,7 - TETRACHLOROINDONE-1

0.5 gram of 4-carbomethoxypentachloroindone and one ml. of aniline were heated in benzene-methanol solution on the steam bath for one hour, the mixture evaporated to dryness, and the residue leached with water. The insoluble product was recrystallized from aqueous acetic acid to obtain 0.5 gram of red crystalline product, M.P. 171 to 173 degrees centigrade.

*Analysis.*—Calculated for $C_{17}H_9O_3NCl_4$: N, 3.36. Found: N, 3.27.

EXAMPLE 7.—PREPARATION OF 3-MORPHOLINO-4 - CARBOMETHOXY - 2,5,6,7-TETRACHLOROINDONE-1

0.5 gram of 4-carbomethoxypentachloroindone and 0.5 gram of morpholine were heated in benzene-methanol solution on the steam bath for one hour, the mixture then evaporated to dryness, and the residue leached with water. The insoluble product was recrystallized from benzene-heptane mixture to obtain 0.4 gram of red needles, M.P. 168 to 169 degrees centigrade.

*Analysis.*—Calculated for $C_{15}H_{11}O_4NCl_4$: N. 3.41. Found: N, 3.2.

EXAMPLE 8.—PREPARATION OF 2-TRICHLOROVINYL - 4,5,6 - TRICHLOROISOPHTHALIC ACID DIMETHYL ESTER

A solution of 2.1 grams of the hydrindone of Example 3 in 50 cc. methanol was refluxed with 1 gram anhydrous sodium carbonate for 40 minutes, then cooled, diluted with several volumes of water, and the precipitated product removed by filtration. The filtrate by Volhard titration was found to contain the theoretical one mole of chloride ion per mole of hydrindone employed. The organic product was colorless crystalline solid, M.P. 88 to 89 degrees centigrade (from aqueous methanol).

*Analysis.*—Calculated for $C_{12}H_6O_4Cl_6$: Cl, 49.8. Found: Cl. 49.3.

EXAMPLE 9.—PRODUCT OF OCTACHLORO, 3a,4,7,7a - TETRAHYDRO - 4,7-METHANOINDENE-1,8-DIONE AND ETHANOL; 4-CARBETHOXY-2,3,3a,4,5,6,7-HEPTACHLORO-3a,4-DIHYDROINDONE

The product was prepared by allowing an ethanolic solution of octachlorotetrahydromethanoindenedione to stand at room temperature for several days. After recrystallization from carbon disulfide and heptane, the compound melted at 95 to 96 degrees centigrade.

*Analysis.*—Calculated for $C_{12}H_5O_3Cl_7$: C, 32.36; H, 1.13; Cl, 55.73. Found: C, 32.32; H, 1.33; Cl, 55.9.

EXAMPLE 10.—4-CARBETHOXYPENTACHLOROINDONE

The reduction of the above ester was conducted with sodium iodide in the manner employed for the methyl homolog, to obtain yellow crystals, M.P. 100 to 102 degrees centigrade (recrystallized from benzene-heptane). The infrared spectrum (Nujol mull) showed carbonyl bands at 5.60 and 5.70 and C=C stretching bands at 6.39 (shoulder at 6.43).

*Analysis.*—Calculated for $C_{12}H_5O_3Cl_5$: C, 38.49; H, 1.35. Found: C, 38.65; H, 1.42.

EXAMPLE 11.—4-CARBETHOXYHEPTACHLOROHYDRINDONE

The chlorination of 4-carbethoxypentachloroindone was conducted as in the case of the methyl ester, to obtain 4 grams (47 percent of theory) of nearly colorless crystals, M.P. 96 to 97 degrees centigrade (from heptane).

*Analysis.*—Calculated for $C_{12}H_5O_3Cl_7$: Cl, 55.73. Found: Cl, 56.3.

EXAMPLE 12.—2 - TRICHLOROVINYL - 4,5,6 - TRICHLOROISOPHTHALIC ACID METHYL ETHYL ESTER (a) From 4-carbomethoxypentachlorohydrindone: A solution of 1 gram of the carbomethoxyhydrindone was refluxed with 0.5 gram of soda ash in anhydrous ethanol for 80 minutes, cooled, diluted with water and the organic product was extracted with benzene, to obtain on evaporation of the benzene and two recrystallizations from aqueous methanol, 0.5 gram colorless needles, M.P. 63 to 65 degrees centigrade. (b) From 4-carbethoxypentachlorohydrindone: In an analogous manner, the carbethoxy ketone was treated with methanol and sodium carbonate to obtain colorless needles, M.P. 63 to 65 degrees centigrade. The products of (a) and (b) did not give a depressed mixed melting point, and had identical infrared spectra.

*Analysis.*—Calculated for $C_{13}H_8O_4Cl_6$: C, 35.42; H, 1.83. Found: C, 35.37; H, 1.83.

EXAMPLE 13

The reaction product of octachloro-3a,4,7,7a-tetrahydro-4,7-methanoindene-1,8-dione and methanol (i.e., 4-carbomethoxy - 2,3,3a,4,5,6,7 - heptachloro-3a,4-dihydroindone) was dissolved in 10 times its weight of glacial acetic acid at 95 to 100 degrees centigrade, and gaseous chlorine was passed into the hot solution over a period of 72 hours. The solution was then evaporated to dryness under reduced pressure, the residue was taken up in methylene chloride, washed with water, then evaporated to dryness and the residue was recrystallized from heptane to obtain nearly colorless crystals, M.P. 101 to 102 degrees centigrade, found by infrared comparison to be 4-carbomethoxyheptachloroindan-1-one (4-carbomethoxyheptachlorohydrindone). Yield was 82 percent of theory.

EXAMPLE 14

A ten percent solution of 4-carbomethoxy-2,3,3a,4,5,6,7-heptachloro-3a,4-dihydroindone (the reaction product of octachloro - 3a,4,7,7a - tetrahydro-4,7-methanoindene-1,8-dione with methanol) in glacial acetic acid was heated for three days at 100 degrees centigrade. The solvent was then evaporated off and the product analyzed by infrared absorption means. It was found to consist of about 50 percent 4-carbomethoxyheptachloroindan-1-one and 50 percent unchanged starting material. The components are separable by fractional crystallization from heptane.

EXAMPLE 15

Dry crystalline 4-carbomethoxy-2,3,3a,4,5,6,7-heptachloro-3a,4-dihydroindone (reaction product of octachloro - 3a,4,7,7a-tetrahydro-4,7-methanoindene-1,8-dione and methanol) was heated for 2½ days in a sealed glass vessel at 140 degrees centigrade. The product was then found by infrared analysis to be principally 4-carbomethoxyheptachloroindan-1-one, with a small amount of perchlorindone present. The product may be purified by recrystallization from heptane, if desired.

Repetition of the experiment at 200 degrees centigrade gave nearly all perchloroindone when a 2½ day heating period was used, but primarily 4-carbomethoxyheptachloroindan-1-one when a 10 minute heating period was used.

In Examples 16–26 the esters of this invention were subjected to tests to determine whether they possessed pesticidal activity. The following test methods were used:

Spray tests (fungicides)

Early blight.—Tomato plants were sprayed with 100 milliliters of the chemical to be tested, dried, inoculated with spores of *Alternaria solani*, and incubated in a moist chamber at 70 degrees Fahrenheit for 24 hours. Control plants were not sprayed with the chemical. Percent control was determined by the formula:

$$100 \times \frac{\text{(number of spots which develop on leaves of untreated tomato plant} - \text{number of spots which develop on leaves of treated plant)}}{\text{number of spots which develop on leaves of untreated plant}}$$

Mildew.—Ten day old Tendergreen bean plants were allowed to take natural infection of *Erysiphe polygoni* from older infected plants. After the infection began to show on the leaves, the plants were sprayed with the chemical to be tested, dried, and kept in a greenhouse. Control plants were subjected to the aforementioned natural infection and kept in a greenhouse. When the control plants developed the disease, the test plants were removed from the greenhouse and inspected for infection.

Soil fungicide tests

Pythium test.—Soil naturally infested with Pythium species was treated with the chemical solution to be tested and allowed to stand 3 days before planting. Plastic pots 3.5 inches x 3.0 inches were filled with the soil, and the chemical was applied to the soil therein by drenching. After 3 days, ten pea seeds, Perfection variety, were planted in each pot. Percent emergence was recorded.

Sclerotium test.—Sterilized soil was inoculated with *Sclerotium rolfsii*, treated with the chemical to be tested, and incubated in moist chambers at 70 degrees Fahrenheit for three days. Perfection variety peas were then planted in said soil, and the percent emergence was recorded.

Nematode test.—Sterilized soil was inoculated with galls formed by *Meloidogyne incognita* on tomato roots, treated with the chemical to be tested, and allowed to stand for two or three days until it was dry enough for mixing. In such soil cucumber seeds were then planted and the roots thereof were examined 10 to 15 days after planting for infection.

Bactericidal test.—The bacteria to be tested were grown on agar slants for 20 hours. To a mixute of the chemical to be tested and nutrient agar was added two drops of the bacterial suspension, and this mixture was shaken and then poured onto sterilized Petri plates. The plates were incubated for 24 hours, and the bacterial growth noted.

EXAMPLE 16

The compound of the formula

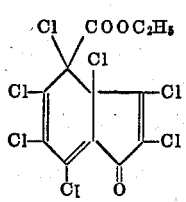

at a concentration of 400 parts per million (0.04 percent aqueous dispersion) exhibited 95 percent control of the fungi *Alternaria solani*. At a concentration of 255 parts per million, said compound exhibited complete control of the bacteria *Escherichia coli* (Gram —) and *Staphylococcus aureus* (Gram +).

EXAMPLE 17

The compound of the formula

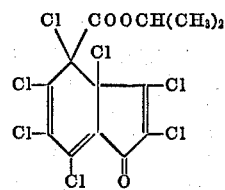

at a concentration of 400 parts per million exhibited 97 percent control of *Alternaria solani*. At a concentration of 255 parts per million, complete control of *Escherichia coli* (Gram —) was obtained. Said compound, at concentrations of 400 parts per million, 25 parts per million, and 147 parts per million exhibited almost complete control of *Sclerotium rolfsii, Erysiphe polygoni,* and *Meloidogyne incognita,* respectively.

EXAMPLE 18

The compound of the formula

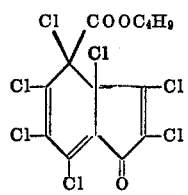

exhibited 89 percent of *Alternaria solani* at a concentration of 400 parts per million, and exhibited complete control of *Escherichia coli* (Gram —) at a concentration of 255 parts per million.

EXAMPLE 19

The compound of the formula

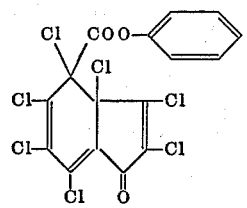

exhibited 64 percent control of *Alternaria solani* at a concentration of 400 parts per million, and exhibited complete control of *Echerichia coli* (Gram —) at a concentration of 255 parts per million.

EXAMPLE 20

The compound of the formula

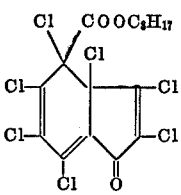

exhibited 93 percent control of *Alternaria solani* at a concentration of 400 parts per million, and from about 40 to 60 percent control of Pythium at an application rate of 64 pounds per acre (i.e., from about 40 to 60 percent of the pea seeds planted in the Pythium-infested soil emerged).

EXAMPLE 21

The compound of the formula

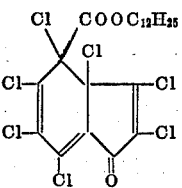

exhibited 71 percent control of *Alternaria solani* at a concentration of 400 parts per million, and from about 20 to about 40 percent control of Pythium at an application rate of 64 pounds per acre.

EXAMPLE 22

The compound of the formula

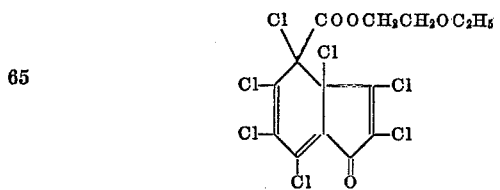

exhibited 99 percent control of *Alternaria solani* at a concentration of 400 parts per million, and 40 percent control of Pythium at an application rate of 64 pounds per acre.

EXAMPLE 23

The compound of the formula $$\text{[structure: hexachloro indanone with COO(CH}_2\text{CH}_2\text{)OC}_2\text{H}_5\text{ substituent]}$$

exhibited 99 percent control of *Alternaria solani* at a concentration of 400 parts per million, and 80 percent control of Pythium at an application rate of 64 pounds per acre.

EXAMPLE 24

The compound of the formula $$\text{[structure: hexachloro indanone with COO(CH}_2\text{)}_4\text{OH substituent]}$$

exhibited 99 percent control of *Alternaria solani* at a concentration of 400 parts per million. Said compound exhibited 100 percent control of Pythium at application rate of 64 pounds per acre.

EXAMPLE 25

The compound of the formula $$\text{[structure: hexachloro indanone with COOCH}_2\text{CH}_2\text{CH}_2\text{OH substituent]}$$

exhibited 99.5 percent control of *Alternaria solani* at a concentration of 400 parts per million, and almost complete control of *Staphylococcus aureus* at a concentration of 255 parts per million.

EXAMPLE 26

A 0.1 percent aqueous dispersion of 4-carbomethoxyheptachlorohydrindone in water was sprayed onto bean plants heavily infested with mites (*Tetranychus atlanticus*). After three days, 100 percent mortality of the mites was observed.

What is claimed is:

1. A method of controlling pests selected from the group consisting of bacteria, fungi, nematodes and mites, comprising applying to the locus of said pests an effective amount of a compound selected from the group consisting of $$\text{[two structures shown, with substituents X, COOH and X, COOR/A/B/D]}$$

and wherein:
R represents a monovalent organic radical selected from the group consisting of (a) unsubstituted alkyl of 1 to 20 carbon atoms, (b) substituted alkyl of 1 to 20 carbon atoms, wherein the substituents are selected from the group consisting of (1) lower alkenyl, (2) lower alkoxy, and (3) phenyl; and (c) phenyl;

A represents (a) chlorine, (b) bromine, (c) amino, and (d) substituted amino, such substituted amino substituents being selected from the group consisting of (1) alkyl of 1 to 20 carbon atoms, and (2) phenyl;

X represents chlorine or bromine;

and B and D represent chlorine or termini of a chemical bond connecting the carbon atoms to which B and D are joined.

2. The method of claim 1, wherein X is chlorine and said pests are selected from the group consisting of bacteria and fungi.

3. The method of claim 2, wherein said compound is of the formula $$\text{[structure with X, COOR substituents]}$$

4. The method of claim 3, wherein R is an unsubstituted alkyl radical of from 1 to about 20 carbon atoms.

5. The method of claim 3, wherein R is phenyl.

6. A method of controlling mites, comprising applying a miticidal amount of 4-carbomethoxyheptachlorohydrindone in aqueous dispersion to plants infested with mites.

References Cited

UNITED STATES PATENTS 2,616,825   11/1952   Gilbert et al.

ALBERT T. MEYERS, Primary Examiner
VINCENT D. TURNER, Assistant Examiner

U.S. Cl. X.R.
71—88, 107, 111; 424—305, 309

UNITED STATES PATENT OFFICE
CERTIFICATE OF CORRECTION

Patent No. 3,472,937      Dated October 14, 1969

Inventor(s) Edward D. Weil

It is certified that error appears in the above-identified patent and that said Letters Patent are hereby corrected as shown below:

Column 2, line 35 - Item B, should read

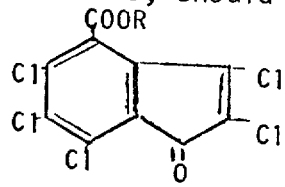

Column 3, line 22, delete "as well as well as", and insert --- as well as ---

Column 4, line 25, first formula, delete and insert

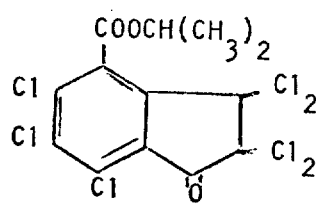

Column 7, middle benzene ring, first equation, delete, and insert

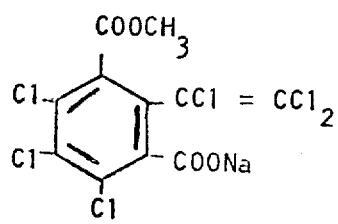

UNITED STATES PATENT OFFICE
CERTIFICATE OF CORRECTION

Patent No. 3,472,937                 Dated  October 14, 1969

Inventor(s)  Edward D. Weil

It is certified that error appears in the above-identified patent and that said Letters Patent are hereby corrected as shown below:

Column 7, middle benzene ring, second equation, delete, and insert

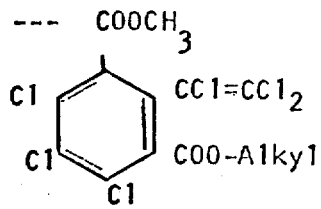

Column 9, line 59, delete "yeld" and insert --- yield ---.
Column 10, line 14 delete "meg./meg." and insert -- mg./meg. ---.
Column 11, Example 9, line 15, delete "octachloro, 3a" and insert --- octachloro - 3a ---.
Column 13, line 11, delete "mixute" and insert --- mixture ---.
Column 14, line 17, delete "Echerichia" and insert --- Escherichia ---.
Column 16, Claim 1, line 5, delete first formula and insert

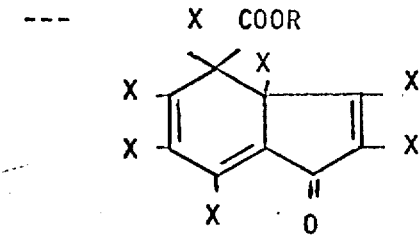

SIGNED AND
SEALED
DEC 15 1970

-2-

(SEAL)
Attest:

Edward M. Fletcher, Jr.
Attesting Officer

WILLIAM E. SCHUYLER, JR.
Commissioner of Patents